May 19, 1959
D. V. JONES
2,887,658
FREQUENCY RESPONSE DETERMINING APPARATUS
Filed Aug. 11, 1954
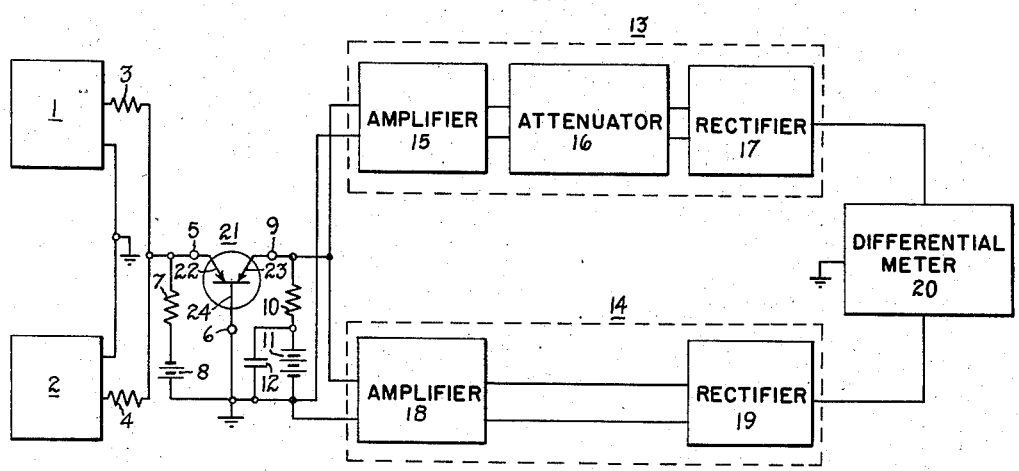
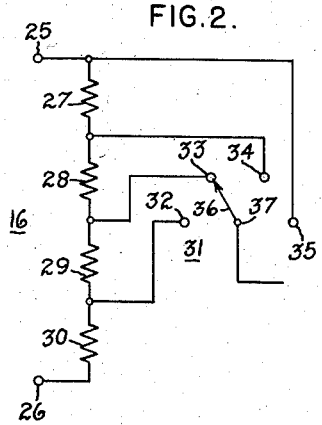
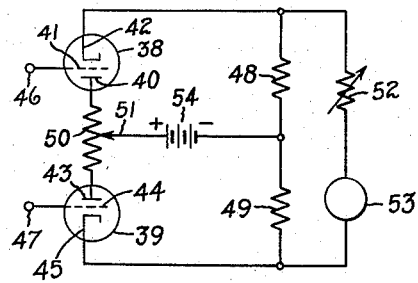
INVENTOR:
DWIGHT V. JONES,
BY Julius J. Zaskalicky
HIS ATTORNEY.

United States Patent Office 2,887,658
Patented May 19, 1959

2,887,658

FREQUENCY RESPONSE DETERMINING APPARATUS

Dwight V. Jones, Baldwinsville, N.Y., assignor to General Electric Company, a corporation of New York Application August 11, 1954, Serial No. 449,204

2 Claims. (Cl. 324—158)

My invention generally relates to apparatus for determining the frequency response of such translating circuits as amplifiers, networks, devices, and the like, and more particularly, to new and improved apparatus for determining the frequency response characteristics of semiconductor amplifier devices.

Semiconductor amplifiers, in general, have a current gain which gradually decreases as the frequency of an input wave which is supplied thereto is increased above a certain value. While for most purposes this characteristic is undesirable, it may be tolerated if the gain of the amplifier is sufficiently high at the operating frequency at which it is to be employed. One parameter which has been employed to assist in classifying semiconductor amplifiers in respect to this frequency response characteristic is the alpha cutoff frequency which is defined as "that frequency at which the short-circuit current gain for a grounded base semiconductor amplifier is three decibels below the low frequency short-circuit current gain." Another such parameter is the beta cutoff frequency, which is defined as "that frequency at which the short-circuit current gain for grounded emitter operation is three decibels below the low frequency short-circuit current gain."

Accordingly, it is an object of the present invention to provide new and improved means for determining the alpha cutoff frequency and the like for semiconductor devices.

It is another object of the present invention to provide new and improved apparatus for measuring, testing and checking the frequency response characteristics of such translating circuits as amplifiers, networks, devices, and the like.

It is still another object of the present invention to provide apparatus for simultaneously determining the response of devices, circuits and the like at different frequencies, thereby simplifying and shortening the test procedure therefor.

In carrying out the present invention as applied to a translating device, there is provided means for simultaneously applying to the input of said device a pair of waves of different frequencies at which it is desired to determine the response of said device. Means are also provided for selectively passing only the wave of one of said frequencies from the output of said device. Means are further provided for selectively passing only the wave of the other of said frequencies from the output of said device. Still further means are provided for detecting the amplitudes of the waves passed by said selective means whereby simultaneously a determination is obtained of the response of said device at said frequencies.

For further objects and advantages and for a better understanding of my invention, attention is now directed to the following description and accompanying drawing and to the appended claims wherein those features of novelty which characterize my invention are pointed out with particularity. In the drawing:

Fig. 1 is a schematic electric circuit of a preferred embodiment of my invention;

Fig. 2 is a schematic diagram of an attenuating circuit which may be employed in conjunction with the embodiment of Fig. 1; and Fig. 3 is a schematic diagram of a new and improved differential amplifier which may be employed in conjunction with the circuit of Fig. 1.

Referring to Fig. 1, there is shown an illustrative embodiment of apparatus constructed in accordance with the teachings of my invention for testing the alpha cutoff frequency of semiconductor amplifiers. A low frequency sine wave generator 1 and a high frequency sine wave generator 2 have output terminals connected through resistors 3 and 4 respectively to an electric terminal 5. The other output terminals of generators 1 and 2 being connected to ground. Since sine wave generators are well known in the art, these generators have been illustrated schematically.

An electric terminal 6 is directly connected to ground and the serial connection of a resistor 7 and a direct voltage source 8 connected between terminals 5 and 6 provide between terminal 5 and ground a high impedance current source. Serially connected between a terminal 9 and terminal 6 are a resistor 10 and a source of direct voltage 11. A capacitor 12 is connected across source 11 so that the impedance between terminals 9 and 6 at the measuring frequency consists principally of resistor 10 which has a low resistance value. The output appearing between terminal 9 and ground is applied to a low frequency channel 13 and also to a high frequency channel 14.

Channel 13 includes a low frequency amplifier 15 connected to be supplied with a signal from terminal 9, an attenuator 16 connected to be supplied with an output wave from amplifier 15, and a rectifier 17 connected to be supplied with an output wave from attenuator 16. Channel 14 comprises a high frequency amplifier 18 connected to be supplied with a signal from terminal 9, and a rectifier 19 connected to be supplied with an output wave from amplifier 18. Amplifier 18 should have a voltage gain response with no attenuation of the signal at the highest measuring frequency. The output waves from rectifiers 17 and 19 are supplied to a differential metering circuit 20 for comparing the outputs from channels 13 and 14.

A semiconductor amplifying device 21, to be tested in accordance with the teachings of my invention, is provided with an emitter electrode 22, a collector electrode 23, and a base electrode 24.

The amplifying device 21 is connected into the circuit of my invention as follows. The emitter is electrically connected to terminal 5, the collector is electrically connected to terminal 9, and the base is electrically connected to terminal 6 which is ground. Thus, the waves from generators 1 and 2 are directly coupled to the input circuit of the amplifier under test. Where very high frequencies are employed, it is necessary to design this portion of the circuit such that the leads are as short as possible.

In accordance with one aspect of my invention, generator 1 is adjusted to provide a low frequency wave, which for convenience may have a frequency of sixty cycles per second, which is available from the power line. Generator 2 is adjusted to provide a high frequency sine wave which is at the minimum required alpha cutoff frequency for the semiconductor amplifier device under test. Because of the coupling arrangement provided between generators 1 and 2 and the input circuit of amplifier 21, both of these waves, i.e., the high and the low frequency waves, are amplified in amplifier 21, and simultaneously appear in the output circuit of the amplifier between terminal 9 and ground.

Amplifier 15 is provided with a frequency band-pass characteristic such that only the low frequency wave produced in generator 1 and amplified in device 21 is passed thereby. The high frequency wave from generator 2 is rejected. Amplifier 18 is provided with a frequency band-pass characteristic such that only the high frequency wave produced in generator 2 and amplified in device 21 is passed thereby. The low frequency wave from generator 1 is rejected. Such amplifiers are well known in the art.

Assuming that generators 1 and 2 supply waves having a sinusoidal variation it will be understood that the amplified waves appearing at the output of amplifiers 15 and 18 also have a sinusoidal characteristic. Amplifiers 15 and 18 are designed to have equal gains at their respective operating frequencies, such that if the input signals thereto are equal in amplitude, the output signals therefrom will also be equal in amplitude. The amplified wave from amplifier 18 is coupled to rectifier 19 wherein it is rectified to obtain at the output of rectifier 19 a unidirectional potential having a magnitude dependent upon the amplitude of the oscillation wave supplied to the rectifier. For this purpose a full wave or a half wave rectifier may be employed.

In low frequency channel 13 the amplified wave appearing at the output terminals of amplifier 15 is reduced in amplitude by means of attenuator 16. The exact reduction in amplitude of the wave, depends upon the particular adjustment of the attenuator. In this particular embodiment of my invention wherein it is desired to test semiconductor amplifiers merely to determine if they meet the minimal requirement in regard to alpha cutoff, this attenuator may be of the step type. For other applications a different type of attenuator might be necessary.

Referring to Fig. 2, there is illustrated a step type attenuator which may be employed to remove energy from the wave appearing at the output of amplifier 15. This attenuating device comprises a pair of terminals 25 and 26 having serially connected therebetween resistors 27, 28, 29, and 30. A switching device 31 provided with contacts 32, 33, 34, 35, and wiper arm 36 connected at one end to a terminal 37 is provided to enable adjustment of the amount of energy taken from an oscillation wave supplied thereto. When this attenuator is employed in the circuit of Fig. 1, terminal 25 is connected to the output of amplifier 15, which in a practical embodiment might be the anode of a power amplifier, and terminal 26 is connected to ground. When the adjustment of switch 31 in attenuator 16 is such that wiper arm 36 is in contact with contact terminal 35, there is no attenuation of the wave provided at terminal 25, the input terminal of the attenuator. As wiper arm 36 is progressively moved to contact terminal 32, the amplitude of the wave appearing at output terminal 37 of attenuator 16 is progressively reduced. Since the alpha cutoff frequency is by definition "that frequency at which the short-circuit current gain for a grounded base semiconductor amplifier is three decibels below the low frequency short-circuit gain," it is desirable that the resistances of resistors 27 through 30 be adjusted such that one of the switch contacts, preferably contact 33 or contact 34, provides a three decibel attenuation of the wave provided between terminals 25 and 26. Since the actual values of these resistors is dependent upon the output impedance of amplifier 15 as well as the input impedance of rectifier 17, no values for the resistances are provided herein. However, those skilled in the art having selected particular amplifiers and rectifiers may readily compute the values which will be required.

The attenuated wave appearing at terminal 37 of attenuator 16 is supplied to rectifier 17, to produce at the output terminal thereof a unidirectional potential having a magnitude dependent upon the amplitude of the wave supplied to the rectifier. The unidirectional potentials thus appearing in the output circuits of rectifiers 17 and 19 respectively are compared in a differential metering circuit 20. Differential meters provide an output which is indicative of which one of two inputs is of the greatest magnitude and which is also indicative of the magnitude of the difference.

Referring to Fig. 3 there is shown a new and improved differential metering circuit employing a pair of electron discharge device amplifiers 38 and 39. Device 38 is provided with an anode 40, a control electrode 41, and a cathode 42. Device 39 is provided with an anode 43, a control electrode 44, and a cathode 45. Terminals 46 and 47 are respectively connected to electrodes 41 and 44. Resistors 48 and 49 are serially arranged between cathodes 42 and 45 and a resistor 50 having a variable tap 51 provided thereon, is interconnected between anodes 40 and 43. The series connection of a variable resistor 52 and a current measuring instrument 53 is provided across the series arrangement of resistors 48 and 49. A direct voltage source illustrated as a battery 54 is interconnected between tap 51 and the junction between resistors 48 and 49. Source 54 is so poled as to provide a positive potential at tap 51 with respect to resistors 48 and 49.

Assume that attenuator 16 has been adjusted such that the wave supplied thereto is decreased in magnitude by the factor of three decibels. Since generator 2 is adjusted to produce a sinusoidal wave at the minimal alpha cutoff frequency, by definition, the gain of device 21 for the high frequency wave should be no less than three decibels below the gain for the low frequency wave. If the device under test has an alpha cutoff frequency at exactly the frequency of the high frequency generator, then the high frequency wave appearing at terminal 9 is exactly three decibels below the amplitude of the low frequency wave appearing at terminal 9. Because channel 13 is adjusted to attenuate a signal supplied thereto by a factor three decibels greater than the circuit of channel 14, the direct potentials supplied to differential meter 20 will be equal. The indication therein provided will thus show that amplifier 21 is satisfactory. If, however, the alpha cutoff frequency of the emplifier under test is less than the frequency of the sinusoidal wave from generator 2, the high frequency wave appearing at terminal 9 will be more than three decibels below the amplitude of the low frequency wave appearing at terminal 9, and the direct potential appearing in the output circuit of rectifier 19 will be less than the direct potential in rectifier 17. Meter 20, will, therefore, give an indication showing that the alpha cutoff frequency of the semiconductor amplifier under test is below the minimal requirements. When, of course, the alpha cutoff frequency of the device under test is higher than the minimal requirement, the unidirectional potential appearing in the output circuit of rectifier 19 is greater than the unidirectional potential appearing in the output circuit of rectifier 17, and a corresponding indication will appear on meter 20. The indication therein provided will thus show that amplifier 21 is above minimal requirements.

In accordance with another aspect of my invention for use in a case wherein it is desired to determine the exact alpha cutoff frequency of a particular semiconductor amplifier, attenuator 16 is adjusted to produce a three decibel reduction of the wave supplied thereto and the frequency of generator 2 is adjusted until differential meter 20 gives an indication that the direct potentials supplied thereto are exactly equal. The frequency of generator 2 is the alpha cutoff frequency of the semiconductor amplifier under test.

In accordance with another aspect of my invention, if it is desired to measure the over-all frequency response characteristics of an amplifier, network, or device, the frequency of oscillation of generator 2 may be progressively varied, and for each frequency supplied to the amplifier, network, or device under test, attenuator 16 is adjusted to balance meter 20. The attenuation provided in attenuator 16 can be calibrated for direct reading and a plot of gain versus frequency of the amplifier may thus be charted. Where it is not desired to chart the over-all frequency response characteristics of the amplifier, network, or device this circuit is equally useful for determining the comparative gain or attenuation of the amplifier, network, or device at any desired frequency. This is accomplished by adjusting generator 1 to the reference frequency and by adjusting generator 2 to the frequency in question and by adjusting attenuator 16 until meter 20 balances. In such an embodiment, an attenuator such as shown in Fig. 2 would not be satisfactory, and an attenuator having a larger number of steps would be desirable. Such attenuators are, of course, well known in the art.

When comparing the attenuation of an amplifier, network, or device at low frequencies rather than at high frequencies, the calibrated attenuator circuit should be located in channel 14, and channel 13 should not attenuate the lowest frequency it is desired to measure. In such a case, channel 14 now carries the standard frequency to which the low frequency attenuation is compared.

While my invention has been described by a particular embodiment thereof, it will be understood that those skilled in the art may make many changes without departing from my invention. Therefore, in the appended claims, I intend to cover all such changes and modifications which fall within the true spirit and scope of my invention.

What I claim is new and desire to secure by Letters Patent of the United States is:

1. Apparatus for determining the alpha cut-off frequency of a semiconductor device comprising first and second sources of oscillations of first and second frequencies, said second frequency being higher than first frequency, means for simultaneously applying said sources of first and second frequencies to the input of said semiconductor device, first and second amplifying channels connected to the output of said semiconductor device, said first channel passing said first frequency and said second channel passing said second frequency, attenuating means connected in said first channel for decreasing the amplitude of said first frequency by the factor of substantially three decibels, means for rectifying the outputs from said first and second channels, and means for comparing the amplitudes of the outputs of said channels, whereby a balancing of the amplitudes of the frequencies of said channels indicates that said second frequency corresponds to the alpha cut-off frequency of said semiconductor device.

2. Apparatus for determining the alpha cut-off frequency of a semiconductor device at different frequencies comprising means for simultaneously applying a relatively low frequency signal and one of a range of relatively high frequency signals to the input of said semiconductor device, a first selective amplifier channel connected to the output of said semiconductor device for passing only said low frequency signal, means in said first channel for attenuating said low frequency signal by an amount which would correspond to the attenuation provided by the semiconductor device at its alpha cut-off frequency, a second selective amplifier channel connected to the output of said semiconductor device for passing only said high frequency signals, means for rectifying the outputs from each of said channels, and differential metering means connected to said outputs for comparing the amplitudes of said outputs, whereby a balance in amplitude of said outputs would indicate thae the high frequency signal applied to said semiconductor device represents the alpha cut-off frequency of said device.

References Cited in the file of this patent

UNITED STATES PATENTS

| | | |
|---|---|---|
| 1,755,244 | Dietze | Apr. 22, 1930 |
| 1,816,958 | Clark et al. | Aug. 4, 1931 |
| 2,632,792 | Selz | Mar. 24, 1953 |
| 2,794,952 | Golden | June 4, 1957 |